(12) United States Patent
Chen et al.

(10) Patent No.: US 10,916,117 B2
(45) Date of Patent: Feb. 9, 2021

(54) COLLISON AVOIDANCE FOR WEARABLE APPARATUSES

(71) Applicant: HEWLETT-PACKARD DEVELOPMENT COMPANY, L.P., Spring, TX (US)

(72) Inventors: Chung-Chun Chen, Taipei (TW); Yi Kang Hsieh, Taipei (TW); Ming-Shien Tsai, Taipei (TW); Isaac Lagnado, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/617,773

(22) PCT Filed: Aug. 24, 2017

(86) PCT No.: PCT/US2017/048303
§ 371 (c)(1),
(2) Date: Nov. 27, 2019

(87) PCT Pub. No.: WO2019/040066
PCT Pub. Date: Feb. 28, 2019

(65) Prior Publication Data
US 2020/0234559 A1    Jul. 23, 2020

(51) Int. Cl.
| | | |
|---|---|---|
| *G01S 5/00* | (2006.01) | |
| *G08B 21/22* | (2006.01) | |
| *A63F 13/211* | (2014.01) | |
| *A63F 13/327* | (2014.01) | |
| *A63F 13/5375* | (2014.01) | |
| *G06F 3/01* | (2006.01) | |

(Continued)

(52) U.S. Cl.
CPC .......... *G08B 21/22* (2013.01); *A63F 13/211* (2014.09); *A63F 13/327* (2014.09); *A63F 13/5375* (2014.09); *G01S 5/00* (2013.01); *G06F 3/011* (2013.01); *G08B 21/0247* (2013.01); *G01S 5/0072* (2013.01); *G02B 27/017* (2013.01)

(58) Field of Classification Search
CPC ..... G02B 27/017; G02B 27/01; A63F 13/211; G01S 5/0072; G01S 5/0264; G01S 5/0289; G01S 5/0284
See application file for complete search history.

(56) References Cited

U.S. PATENT DOCUMENTS

| | | |
|---|---|---|
| 5,900,849 A | 5/1999 | Gallery |
| 9,241,209 B2 | 1/2016 | Toelle et al. |
| 9,552,676 B2 | 1/2017 | Wong et al. |

(Continued)

FOREIGN PATENT DOCUMENTS

| | | |
|---|---|---|
| EP | 3017437 | 5/2016 |
| WO | WO-17113313 | 7/2017 |

OTHER PUBLICATIONS

Colaner, S. "Intel Hates Cables, Vr Edition: A Wore;ess Vr Demo", Aug. 22, 2016.

*Primary Examiner* — Benyam Haile
(74) *Attorney, Agent, or Firm* — HPI Patent Development (57) ABSTRACT

Examples of techniques for avoiding collision of wearable apparatuses is described. In an example implementation, a collision avoidance indicator is provided to a wearable apparatus while providing AV content to avoid collision of users wearing the wearable apparatus and a peer wearable apparatus.

15 Claims, 6 Drawing Sheets

(51) Int. Cl.
    *G08B 21/02*     (2006.01)
    *G02B 27/01*     (2006.01)

(56) References Cited

U.S. PATENT DOCUMENTS

| | | | |
|---|---|---|---|
| 2015/0024368 A1* | 1/2015 | King, Jr. | G09B 5/02 |
| | | | 434/365 |
| 2016/0071546 A1 | 3/2016 | Neymotin | |
| 2016/0275722 A1 | 9/2016 | Bretschneider | |
| 2016/0351054 A1 | 12/2016 | Zhang | |
| 2017/0045941 A1* | 2/2017 | Tokubo | A63F 13/53 |
| 2017/0123426 A1 | 5/2017 | Hill | |
| 2018/0091634 A1* | 3/2018 | Mobasher | H04L 1/0009 |

* cited by examiner

COMPUTING DEVICE 300

TRANSCEIVER 302

(TO TRANSMIT AUDIO-VIDEO CONTENT OVER TO A WEARABLE APPARATUS;
TO OBTAIN A RECEIVED SIGNAL STRENGTH INDICATION VALUE AND GYRO-SENSOR DATA;
AND
TO TRANSMIT A COLLISION AVOIDANCE INDICATOR OVER TO THE WEARABLE APPARATUS TO AVOID COLLISION OF USERS WEARING THE WEARABLE APPARATUS AND A PEER WEARABLE APPARATUS)

COLLISON AVOIDANCE FOR WEARABLE APPARATUSES

BACKGROUND

Wearable apparatuses, such as headsets with head-mount display (HMD) units may be used by users for experiencing virtual or augmented reality. Such a wearable apparatus may provide, along with audio contents, video contents on the HMD unit for a user to experience a real-time virtual environment that is responsive to user's movements and gestures.

BRIEF DESCRIPTION OF DRAWINGS

The following detailed description references the drawings, wherein.

DETAILED DESCRIPTION

A wearable apparatus used in a virtual or augmented reality environment receives audio-video (AV) content from a computing device, such as a personal computer. The audio, from the received content, is provided through a speaker, and the video, from such content, is rendered to a head-mount display (HMD) unit for a user to experience virtual reality.

A virtual reality environment may involve transmission of videos with high resolution and high frame rates. Such videos involve large data which may be transmitted over a high bandwidth connection. The wearable apparatus is generally connected to a computing device through a wired connection for transmission of AV content. The audio content may be transmitted through one wired connection, and the video content may be transmitted through a separate wired connection. The wired connection between the wearable apparatus and the computing device limits the movement of the user and may also involve safety concerns that may be caused by the user coming in contact of the wire.

Further, multiple users wearing their respective wearable apparatuses may connect to access a virtual reality application in the virtual reality environment. The virtual reality application may be a game which may involve movement of the users. While accessing such a virtual reality application from a common physical space, for example a room, the users may collide with each other. Collision of users with each other may affect the user experience of accessing the virtual reality application.

The present subject matter describes approaches for wireless communication between wearable apparatuses and computing devices in a virtual reality environment. The present subject matter also describes approaches for avoiding collisions between peers each having wearable apparatuses while accessing a virtual reality application in the virtual reality environment. The approaches of the present subject matter provide a high bandwidth wireless communication which facilitates in eliminating the use of wired connection between the wearable apparatuses and the computing devices. The approaches of the present subject matter also facilitate in enhancing the user experiencing by avoiding collisions between the users.

According to an example implementation of the present subject matter, a wearable apparatus includes a plurality of antenna elements for wireless communication with a computing device in a virtual reality environment. The wearable apparatus may be a headset that can be worn by a user, for example, over his head. The wearable apparatus is couplable to a HMD unit on which video content associated with virtual reality can be rendered. The computing device may be a personal computer or a gaming console. The computing device includes a transceiver that wirelessly couples with the plurality of antenna elements of the wearable apparatus. In an example implementation, the plurality of antenna elements of the wearable apparatus and the transceiver of the computing device may be 802.11ad transceivers, 802.11ad transceivers enable high bandwidth wireless communication between the wearable apparatus and the computing device.

In an example implementation, the computing device transmits, while transmitting AV content, a collision avoidance indicator over to the wearable apparatus. The collision avoidance indicator is generated when a relative distance of the wearable apparatus with respect to a peer wearable apparatus is less than a predefined distance. The collision avoidance indicator is indicative of increasing the relative distance between the wearable apparatus and the peer wearable apparatus by indicating to the user of the wearable apparatus to move in a direction so as to avoid collision with user oaf the peer wearable apparatus.

In an example implementation, the wearable apparatus includes separate sets of antenna elements, where one set is to receive AV content from the computing device, and another set is to receive the collision avoidance indicator from the computing device. The separate sets of antenna elements, i.e., separate 802.11ad transceivers at the wearable apparatus, facilitate in good quality wireless communication with low latency and interference in the virtual reality environment.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Figure 1:
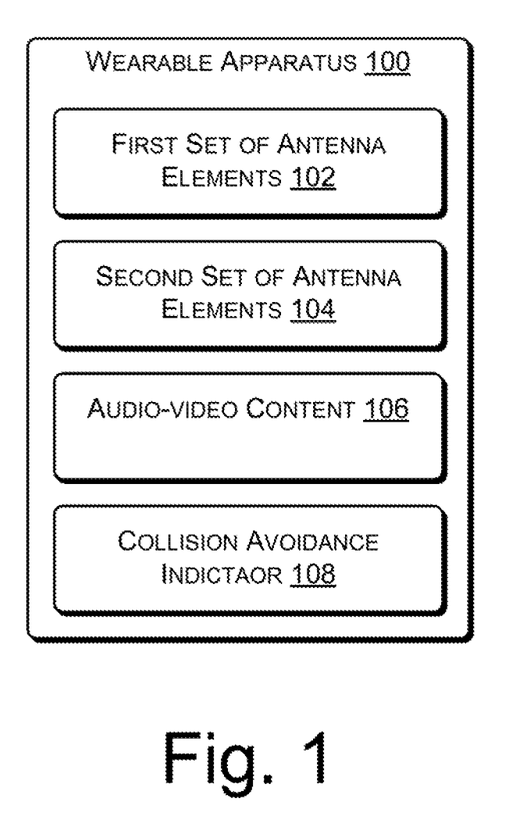
FIG. 1 illustrates a block diagram of a wearable apparatus, according to an example of the present subject matter.

FIG. 1 illustrates a block diagram of a wearable apparatus 100, according to an example of the present subject matter. The wearable apparatus 100, as shown, includes a first set of antenna elements 102 and a second set of antenna elements 104. The first set of antenna elements 102 receives AV content from a computing device (not shown in FIG. 1). The second set of antenna elements 104 receives a collision avoidance indicator from the computing device during the reception of the AV content. The collision avoidance indicator, received at the wearable apparatus 100, is indicative of increasing a relative distance between the wearable apparatus 100 and a peer wearable apparatus (not shown in FIG. 1) to avoid collision of users wearing the wearable apparatus 100 and the peer wearable apparatus. The collision avoidance indicator indicates a direction which the user may move in so as to increase the relative physical distance between the wearable apparatus 100 and a peer wearable apparatus (not shown in FIG. 1). The communication between the wearable apparatus and computing device for the purpose of collision avoidance is described in detail through FIG. 4.

In an example implementation, data associated with the AV content, represented by block 'AV content 106' in FIG. 1, and data associated with the collision avoidance indicator, represented by block 'collision avoidance indicator 108' in FIG. 1, may be stored in a memory (not shown) of the wearable apparatus 100 for further processing. The memory of the wearable apparatus 100 may include, for example, volatile memory (e.g., RAM), and/or non-volatile memory (e.g., EPROM, flash memory, NVRAM, memristor, etc.).

In an example implementation, the first set and the second set of antenna elements 102 and 104 may be 802.11ad transceivers. The first set and the second set of antenna elements 102 and 104 may be in a single antenna or distributed across more than one antenna. An example configuration of components of the wearable apparatus is described in detail through FIG. 2.

In an example implementation, the wearable apparatus 100 may also include a third set of antenna elements (not shown) to transmit a notification to the computing device to alter a signal transmission channel, when a signal quality value of the received AV content is below a predefined quality threshold value. For this, the wearable apparatus 100 determines the signal quality value of the received AV content and compare with the predefined quality threshold value. The signal quality value and the predefined quality threshold value may be indicated in terms of signal-to-noise ratio (SNR) values. The predefined quality threshold value may be stored in the memory of the wearable apparatus 100. In an example implementation, the third set of antenna elements may also be 802.11ad transceivers.

Figure 2:
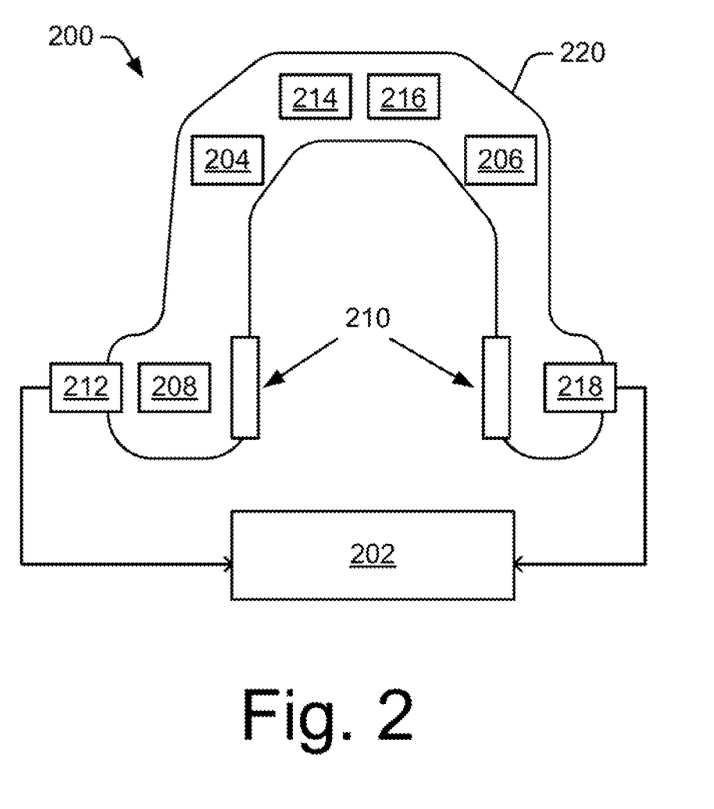
FIG. 2 illustrates a wearable apparatus coupled to a head-mount display (HMD) unit, according to an example of the present subject matter.

FIG. 2 illustrates a wearable apparatus 200 coupled to a HMD unit 202, according to an example of the present subject matter. The wearable apparatus 100 may be implemented as the wearable apparatus 200. The wearable apparatus 200 may be in the form of a headset that can be worn by a user. The HMD unit 202 may be worn by the user over his one eye or both eyes. The HMD unit 202 may be external to the wearable apparatus 200. The HMD unit 202 can be connected to the wearable apparatus 200 for rendering video content on the HMD unit 202.

The wearable apparatus 200, as shown in FIG. 2, includes two antennas 204 and 206. The antennas 204 and 206 are 802.11ad transceivers. Each of the antennas 204 and 206 may include N antenna elements (not shown). N, for example, may be 30 or 60. N/3 antenna elements of both the antennas 204 and 206 together form a first set of antenna elements. Another N/3 antenna elements of both the antennas 204 and 206 together form a second set of antenna elements. The remaining N/3 antenna elements of both the antennas 204 and 206 together form a third set of antenna elements. The first, second, and third sets of antenna elements are used for different purposes in accordance with the present subject matter as described herein. Further, the two antennas 204 and 206 may be positioned so as to have more coverage area for signals reception and transmission at and from the wearable apparatus 200. Although two antennas are shown in FIG. 2, in an example implementation, the wearable apparatus may include one antenna or more than two antennas.

The wearable apparatus 200 further includes a data processing engine 208. The data processing engine 208 can be implemented through a combination of any suitable hardware and computer-readable instructions. The data processing engine 208 may be implemented in a number of different ways to perform various functions for a user to experience virtual reality on the HMD unit 202 and avoiding collision between peer wearable apparatuses. For example, the computer-readable instructions for the data processing engine 208 may be processor-executable instructions stored in a non-transitory computer-readable storage medium, and the hardware for the data processing engine 208 may include a processing, resource (e.g., processor(s), to execute such instructions. In the present examples, the non-transitory computer-readable storage medium stores instructions which, when executed by the processing resource, implements the data processing engine 208. The wearable apparatus 200 may include the non-transitory computer-readable storage medium storing the instructions and the processing resource (not shown) to execute the instructions. In an example, the non-transitory computer-readable storage medium storing the instructions may be external, but accessible to the processing resource of the wearable apparatus 200. In another example, the data processing engine 208 may be implemented by electronic circuitry.

The processing resource of the wearable apparatus 200 may be implemented as microprocessors, microcomputers, microcontrollers, digital signal processors, central processing units, state machines, logic circuitries, and/or any devices that manipulate signals based on operational instructions. Among other capabilities, the processing resource may fetch and execute computer-readable instructions stored in a non-transitory computer-readable storage medium coupled to the processing resource of the wearable apparatus 200. The non-transitory computer-readable storage medium may include, for example, volatile memory (e.g., RAM), and/or non-volatile memory (e.g., EPROM, flash memory, NVRAM, memristor, etc.).

The wearable apparatus 200 includes a speaker unit 210 communicatively coupled to the data processing engine 208. The data processing engine 208 provides audio content to the speaker unit 210 for the user wearing the wearable apparatus 200 to experience sound associated with virtual reality. The speaker unit 210 may include two speakers, one of the left ear of the user and the other for the right ear of the user.

The wearable apparatus 200 also includes a content output interface 212 communicatively coupled to the data processing engine 208. The data processing engine 208 provides video content through the content output interface 212 to the HMD unit 202. The content output interface 212 may be a High Definition Multimedia Interface (HDMI) or a Universal Serial Bus (USB) interface.

The wearable apparatus 200 further includes a gyro-sensor 214. The gyro-sensor 214 determines the orientation of the wearable apparatus 200 by recording the angular velocity of the wearable apparatus 200. The wearable apparatus further includes a battery 216 and a power output interface 218. The battery 216 may supply power to all the components of the wearable apparatus 200, and may supply power to the HMD unit 202 through the power output interface 218. The battery 216 may, for example, include 6 or more cells. The power output interface 218 may be a USB interface.

In an example, some or all the components of the wearable apparatus 200 may be enclosed in a housing 220. The housing 220 may be in the form of a band which can be worn by the user over his head.

For displaying user to experience virtual reality, the HMD unit 202 is connected to the wearable apparatus 200 through the content output interface 212 and the power output interface 218. The wearable apparatus 200 receives AV content from a computing device through the first set of antenna elements. The data processing engine 208 is communicatively coupled to the first set of antenna, elements to process the received AV content to segregate audio content and video content from the AV content. In an example implementation, the data processing engine 208 may include a wireless 802.11ad module and an AV decoder for processing the AV content. Upon processing the AV content, the data processing engine 208 provides the audio content to the speaker unit 210, and provides the video content to the HMD unit 202 through the content output interface 212.

For the purpose of avoiding collision between the arable apparatus 200 and a peer wearable apparatus, the data associated with the gyro-sensor 214 and a received signal strength indication (RSSI) value associated with the received AV content are provided to the computing device. The data associated with the gyro-sensor 214, referred to as the gyro-sensor data, may include the angular velocity data recorded by the gyro-sensor 214. The gyro-sensor data may be indicative of orientation of the wearable apparatus 200. The RSSI value may be indicative of the strength, in a dB scale, of the AV content received at each of the first set of antenna elements of the wearable apparatus 200. The RSSI value may be determined by the data processing engine 208. In an example implementation, the data processing engine 208 is communicatively coupled to the second set of antenna elements. The data processing engine 208 provides the gyro-sensor data and the RSSI value to the second set of antenna elements to further transmit the same to the computing device.

The computing device processes the gyro-sensor data and the RSSI value for the wearable apparatus 200 with gyro-sensor data and a RSSI value received from a peer wearable apparatus to determine a relative distance between the wearable apparatus 200 and the peer wearable apparatus. Depending on the determined relative distance, the computing device may generate a collision avoidance indicator indicative of increasing the relative distance to avoid collision of users wearing the wearable apparatus 200 and the peer wearable apparatus.

The wearable apparatus 200 receives the collision avoidance indicator from the computing device through the second set of antenna elements. The data processing engine 208, communicatively coupled to the second set of antenna elements, provides the collision avoidance indicator to the HMD unit 202 through the content output interface 212.

Further, in an example implementation, the data processing engine 208 may determine a signal quality value of the received AV content and compare with a predefined quality threshold value. The predefined quality threshold value may be stored in the memory of the wearable apparatus 200. When the signal quality value of the received AV content is determined to be below the predefined quality threshold value, generate a notification indicative of alteration of a signal transmission channel at the computing device. In an example implementation, the data processing engine 208 is communicatively coupled to the third set of antenna elements. The data processing engine 208 provides the generated notification to the third set of antenna elements to transmit the same to the computing device.

Figure 3:
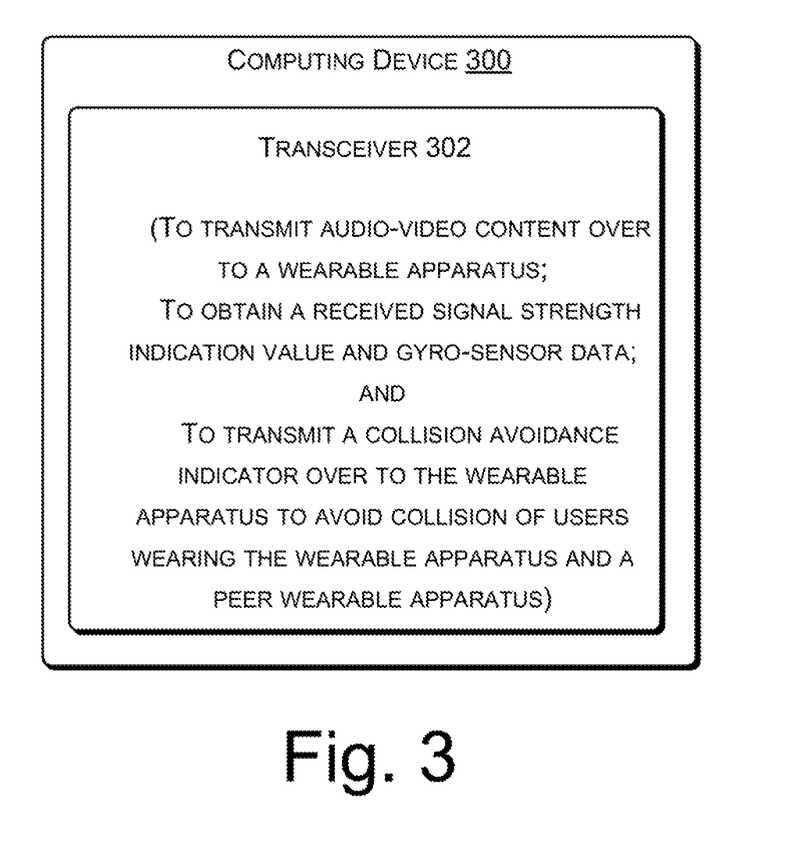
FIG. 3 illustrates a block diagram of a computing device for simulating virtual reality and avoiding collision between peer wearable apparatuses, according to an example of the present subject matter.

FIG. 3 illustrates a block diagram of a computing device 300 for simulating virtual reality and avoiding collision between peer wearable apparatuses, according to an example of the present subject matter. The computing device 300 may be implemented as a computer, for example a desktop computer, a laptop, server, and the like.

The computing device 300 includes a transceiver 302, for example, a 802.11ad transceiver. The transceiver 302 of the computing device 300 transmits AV content over to a wearable apparatus, for example, the wearable apparatus 200. The transceiver 302 obtains a RSSI value associated with the AV content received at the wearable apparatus 200 and obtains gyro-sensor data associated with the wearable apparatus 200. The transceiver 302 may also obtain a RSSI value and gyro-sensor data similarly associated with a peer wearable apparatus. As described earlier, the computing device 300 determines a relative distance between the wearable apparatus 200 and the peer wearable apparatus based on the gyro-sensor data and the RSSI values associated with the wearable apparatus 200 and the peer wearable apparatus. When the relative distance of the wearable apparatus 200 with respect to the peer wearable apparatus is determined to be less than a predefined distance, the computing device generates a collision avoidance indicator indicative of a direction to move the user of the wearable apparatus 200 for increasing the relative distance of the wearable apparatus 200 with respect to the peer wearable apparatus. In an example, the predefined distance may be 1 m. The transceiver 302 transmits the collision avoidance indicator over to the wearable apparatus 200, during transmission of the AV content, to avoid collision of users wearing the wearable apparatus 200 and the peer wearable apparatus.

In an example implementation, the transceiver 302 may receive a notification, as described earlier, to alter a signal transmission channel. The notification may be received when a signal quality value of the AV content, received at the wearable apparatus 200, is below a predefined quality threshold value.

In an example implementation, the computing device 300 may include one or more engines (not shown) which may be implemented in a number of different ways to perform various functions for the purposes of simulating virtual reality and avoiding collision between peer wearable apparatuses. For example, the engine(s) may provide the AV content to the transceiver 302 to further transmit the same over to a wearable apparatus. The engine(s) may also receive the RSSI value and the gyro-sensor data obtained by the transceiver 302. The engine(s) may process the RSSI value and the gyro-sensor data to determine the relative distance between the peer wearable apparatuses, and accordingly generate the collision avoidance indicator. The engine(s) may further provide the collision avoidance indicator to the transceiver 302 to further transmit the same over to the wearable apparatus.

The engine(s) of the computing device 300 can be implemented through a combination of any suitable hardware and computer-readable instructions. For example, the computer-readable instructions for the engine(s) may be processor-executable instructions stored in a non-transitory computer-readable storage medium, and the hardware for the engine(s) may include a processing resource (e.g., processor(s)), to execute such instructions. In the present examples, the non-transitory computer-readable storage medium stores instructions which, when executed by the processing resource, implements the engine(s). The computing device 300 may include the non-transitory computer-readable storage medium storing the instructions and the processing resource (not shown) to execute the instructions. In an example, the non-transitory computer-readable storage medium storing the instructions may be external, but accessible to the processing resource of the computing device 300. In another example, the engine(s) may be implemented by electronic circuitry.

The processing resource of the computing device 300 may be implemented as microprocessors, microcomputers, microcontrollers, digital signal processors, central processing units, state machines, logic circuitries, and/or any devices that manipulate signals based on operational instructions. Among other capabilities, the processing resource may fetch and execute computer-readable instructions stored in a non-transitory computer-readable storage medium coupled to the processing resource of the computing device 300. The non-transitory computer-readable storage medium may include, for example, volatile memory (e.g., RAM), and/or non-volatile memory (e.g., EPROM, flash memory, NVRAM, memristor, etc.).

Figure 4:
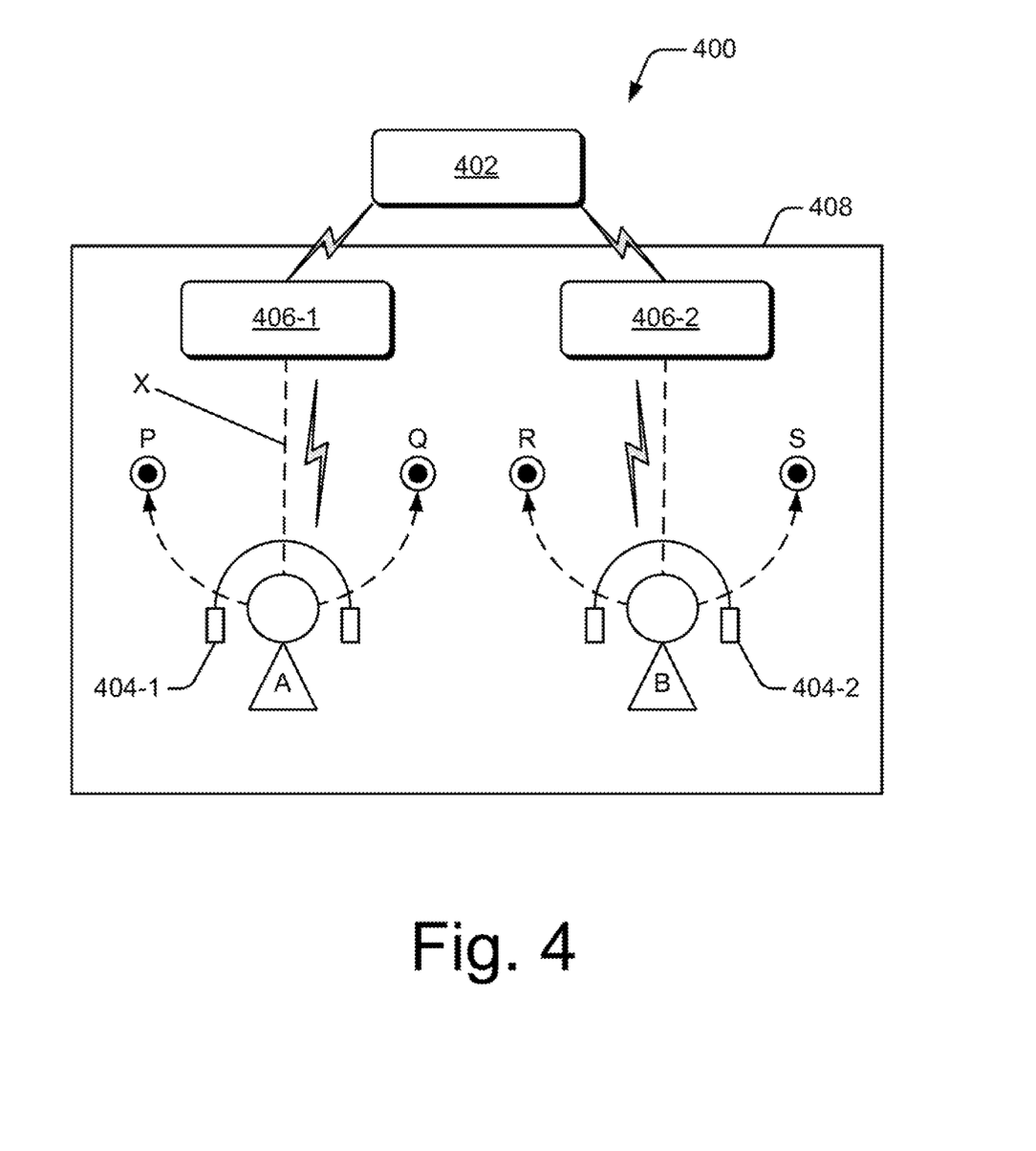
FIG. 4 illustrates a multi-user interactive environment, according to an example of the present subject matter.

FIG. 4 illustrates a multi-user interactive environment 400, according to an example of the present subject matter. Multiple users can connect in the multi-user interactive environment 400, hereinafter referred to as the environment 400, to experience virtual reality on their respective wearable apparatuses and connected HMD units. The environment 400 includes a computing device 402 hosting a virtual reality application. The computing device 402 may be referred to as a host computer. The computing device 402 may be the computing device 300, as described earlier, for simulating virtual reality and avoiding collision between peer wearable apparatuses connected in the environment 400. The computing device 402 includes a transceiver (not shown), similar to the transceiver 302, as described earlier with reference to FIG. 3.

The environment 400 includes two users, each wearing a respective wearable apparatus connected to a HMD unit. Each wearable apparatus is communicatively coupled to the computing device 402 through a respective user device. As shown in FIG. 4, user A wearing a first wearable apparatus 404-1 is connected to the computing device 402 through a first user device 406-1, and user B wearing a second wearable apparatus 404-2 is connected to the computing device 402 through a second user device 406-2. Each of the wearable apparatuses 404-1 and 404-2 may be similar to the wearable apparatus 200 and connected to a HMO unit (not shown). The user device 406-1, 406-2 may be an intermediate device, such as a personal computer or a gaming console. Each of the user devices also includes a 802.11ad transceiver, which communicatively couples with the transceiver of the computing device 402 and the antenna elements of the wearable apparatuses 404-1 and 404-2.

The description herein describes the operation of the computing device 402 and the wearable apparatuses 404-1 and 404-2 for the purpose of simulating virtual reality and avoiding collision between the wearable apparatuses 404-1 and 404-2. As shown in FIG. 4, users A and B are located in a common physical space 408, for example a room, for experiencing virtual reality. The user devices 406-1 and 406-2 are placed at a distance with respect to each other. Users A and B wearing their respective wearable apparatuses 404-1 and 404-2 may positioned in front of the user devices 406-1 and 406-2, respectively, so as to have some distance between them while experiencing virtual reality. Further, although the computing device 402 is shown to be outside the common physical space 408, in an example implementation, the computing device 402 may be in the common physical space 408.

The computing device 402 transmits the AV content to each of the wearable apparatuses 404-1 and 404-2 via the respective user devices 406-1 and 406-2. The wearable apparatuses 404-1 and 404-2 receive the AV content through their respective first set of antenna elements. While receiving the AV content, each of the wearable apparatuses 404-1 and 404-2 transmits the gyro-sensor data and the RSSI value to the computing device 402 via the respective user devices 406-1 and 406-2. The RSSI value associated with the AV content received at the first wearable apparatus 404-1 is characteristic of the position of the first wearable apparatus 404-1 from the first user device 406-1. Similarly, the RSSI value associated with the AV content received at the second wearable apparatus 404-2 is characteristic of the position of the second wearable apparatus 404-2 from the second user device 406-2. The closer the wearable apparatus to the user device, the higher is the RSSI value. The RSSI value may be measured in terms of dBs, where 0 dB is indicative of maximum RSSI value and negative value of dB is indicative of fall in the RSSI value.

The computing device 402 may store a mapping table comprising RSSI values with respect to positions of the wearable apparatus from the user device. The mapping table is determined and stored in the computing device 402 as a part of a calibration process of wearable apparatuses and user devices in the environment 400.

The computing device 402, upon receiving the RSSI values and gyro-sensor data associated with the wearable apparatuses 404-1 and 404-2, compares the RSSI values with those in the mapping table to determine the position of the first wearable apparatus 404-1 with respect to the first user device 406-1 and the position of the second wearable apparatus 404-2 with respect to the second user device 406-2. It may be noted that the RSSI value may fall symmetrically for positions towards, right side and left side from a straight line between the wearable apparatus and the user device. For example, the RSSI value for the first wearable apparatus 404-1 may be the same when the first wearable apparatus 404-1 is at position P or Q, as shown in FIG. 4. Similarly, the RSSI value for the second wearable apparatus 404-2 may be the same when the second wearable apparatus 404-2 is at position R or S, as shown in FIG. 4. The computing device 402 utilizes the gyro-sensor data to distinguish whether the wearable apparatus is moving towards the left or the right from the straight line between the wearable apparatus and the user device. As described earlier, the gyro-sensor data is indicative of the orientation of the wearable apparatus. For example, if the orientation of the first wearable apparatus 404-1 is towards the right, then position of the first wearable apparatus 404 is determined to be towards the right from the straight line X, depending on the RSSI value.

Thus, based on the above, the computing device 402 determines positions of the wearable apparatuses 404-1 and 404-2 with respect to the user devices 406-1 and 406-2, and accordingly determines the relative distance between the wearable apparatuses 404-1 and 404-2. The computing device 402 then determines whether the relative distance is below a predefined distance.

When the relative distance is below the predefined distance, the computing device 402 generates a collision avoidance indicator and transmits the collision avoidance indicator to the wearable apparatus. In an example implementation, the computing device 402, based on the position of the wearable apparatuses 404-1 and 404-2, may determine which of the wearable apparatuses 404-1 and 404-2 has moved away from its default position more in comparison to the other wearable apparatus. The default position may be a position in front of the associated user device. Accordingly, the computing device 402 may generate the collision avoidance indicator and transmit the collision avoidance indicator to that wearable apparatus via the associated user device. For example, if the first wearable apparatus 404-1 is determined to have moved away from its default position and more towards the second wearable apparatus 404-2, then the computing device 402 may generate the collision avoidance indicator indicative of the direction to move user A to away from user B to increase the relative distance between the wearable apparatuses 404-1 and 404-2. The computing device 402 transmits the collision avoidance indicator to the first user device 406-1 for further transmission to the first wearable apparatus 404-1. The first wearable apparatus 404-1 receives the collision avoidance indicator through its second set of antenna elements. The collision avoidance indicator is provided to the HMD unit connected to the first wearable apparatus 404-1. The direction of movement of the user, as indicated in the collision avoidance indicator, may be displayed on the display screen of the HMD unit. User A may accordingly move to avoid collision with user B.

Further, each of the wearable apparatuses 404-1 and 404-2, respectively, determines the signal quality value for the received AV content. When any of the wearable apparatuses 404-1, 404-2 determines the signal quality value to be below a predefined quality threshold value, then that wearable apparatus generates a notification indicative of alteration of a signal transmission channel at the computing device 402. The wearable apparatus transmits the notification over to the computing device 402 via the associated user device. The computing device 402, upon receiving the notification, switches the signal transmission channel for subsequent transmission of AV content and other data, such as the collision avoidance indicator.

It may be noted that the environment 400 is illustrated and described herein with respect to two users, however, in an example implementation, the multi-user interactive environment may include more than two users.

Further, it may be noted that the computing device 402 functions as computing device 300 for simulating virtual reality and avoiding collision between peer wearable apparatuses connected in the environment 400. However, in an example implementation, one of the user devices connected in the environment 400 may be the main computing device that functions as the computing device 300 for simulating virtual reality and avoiding collision between peer wearable apparatuses. In such an implementation, all the user devices connected in the environment are communicatively coupled with the main computing device (i.e., the main user device).

Figure 5:
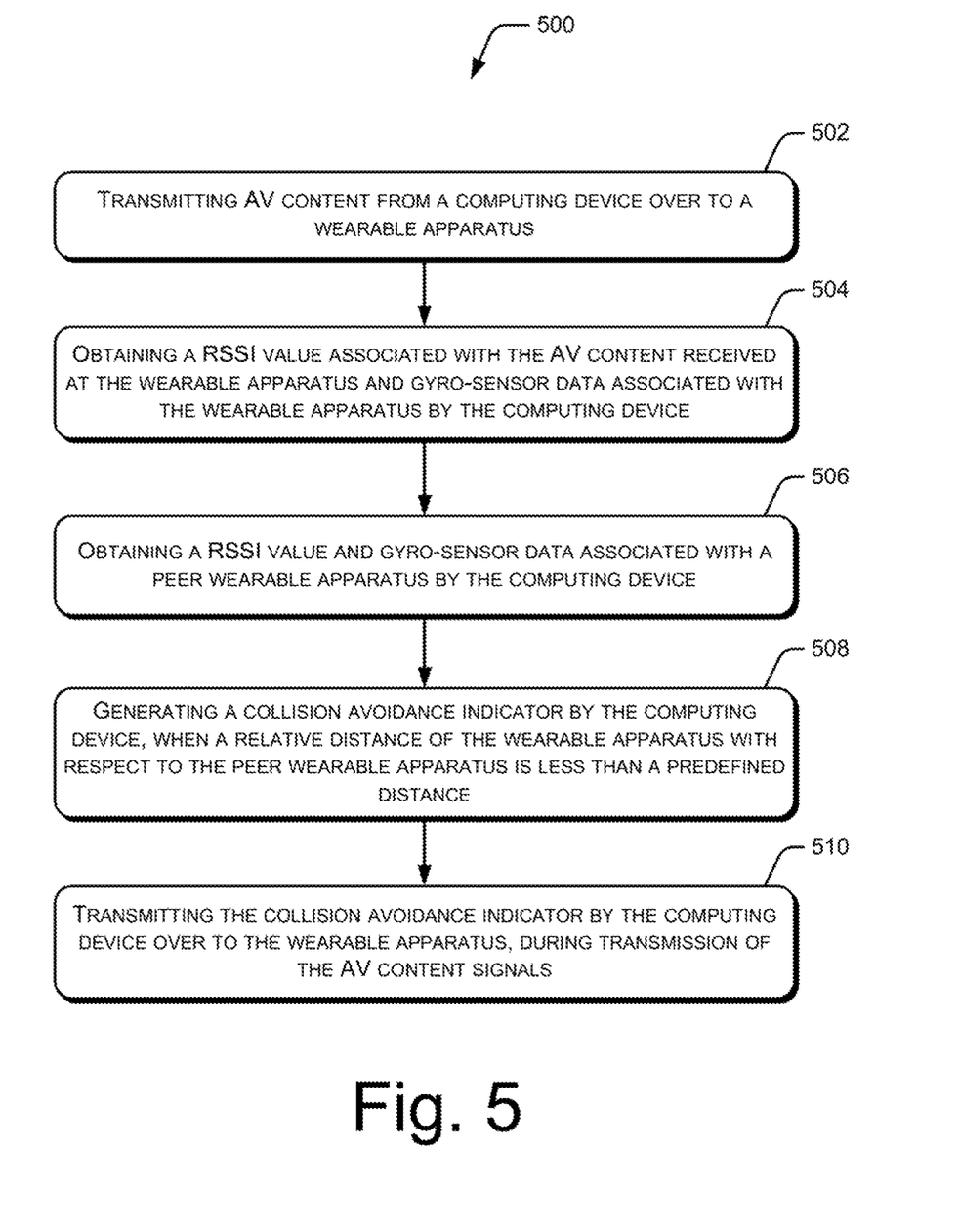
FIG. 5 illustrates a method for simulating virtual reality and avoiding collision between peer wearable apparatuses, according to an example of the present subject matter.

FIG. 5 illustrates a method 500 for simulating virtual reality and avoiding collision between peer wearable apparatuses, according to an example of the present subject matter. The method 500 can be implemented by processor(s) or device(s) through any suitable hardware, a non-transitory machine-readable medium, or a combination thereof. Further, although the method 500 is described in context of the aforementioned computing device 300, other suitable devices or systems may be used for execution of the method 500. In some example implementations, processes involved in the method 500 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 5, at block 502, AV content is transmitted from the computing device 300 over to a wearable apparatus, for example, the wearable apparatus 200. The AV content is associated with virtual reality that a user may experience using the wearable apparatus 200 and a HMD unit coupled to the wearable apparatus 200. At block 504, a RSSI value associated with the AV content received at the wearable apparatus 200 and gyro-sensor data associated with the wearable apparatus 200 are obtained by the computing device 300. At block 506, a RSSI value and gyro-sensor data associated with a peer wearable apparatus are obtained by the computing device 300. As described earlier, a relative distance between the wearable apparatus 200 and the peer wearable apparatus is determined by the computing device 300 based on the gyro-sensor data and the RSSI values associated with the wearable apparatus 200 and the peer wearable apparatus. At block 508, a collision avoidance indicator is generated by the computing device 300, when the relative distance of the wearable apparatus 200 with respect to the peer wearable apparatus is determined to be less than a predefined distance. The collision avoidance indicator is indicative of a direction to move the user of the wearable apparatus 200 for increasing the relative distance of the wearable apparatus 200 with respect to the peer wearable apparatus. At block 510, the collision avoidance indicator is transmitted by the computing device 300 over to the wearable apparatus 200, during transmission of the AV content, to avoid collision of users wearing the wearable apparatus 200 and the peer wearable apparatus.

Figure 6:
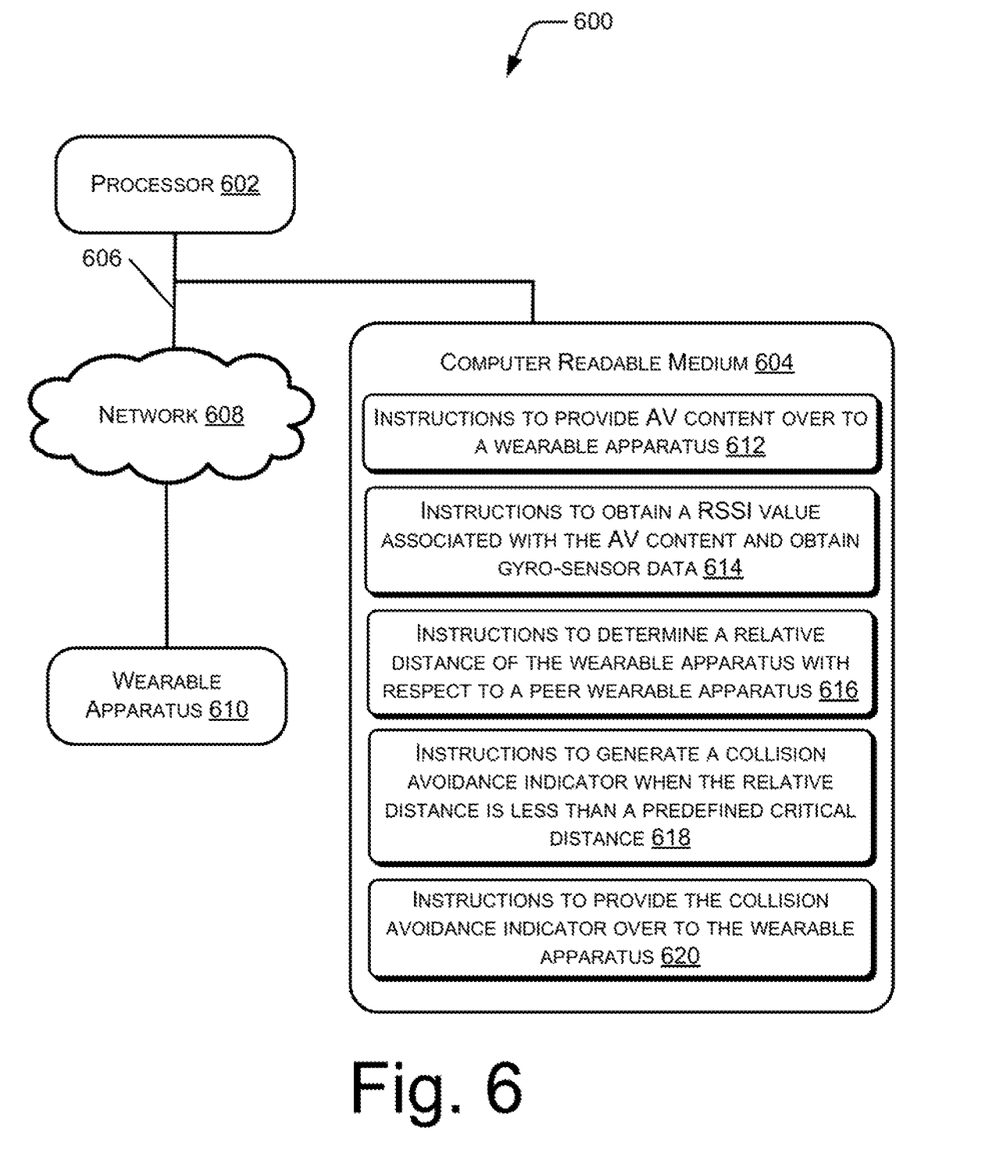
FIG. 6 illustrates a system environment implementing a non-transitory computer-readable medium for simulating virtual reality and avoiding collision between peer wearable apparatuses, according to an example of the present subject matter.

FIG. 6 illustrates a system environment 600 implementing a non-transitory computer-readable medium for simulating virtual reality and avoiding collision between peer wearable apparatuses, according to an example of the present subject matter. The system environment 600 includes a processor 602 communicatively coupled to the non-transitory computer-readable medium 604 through a communication link 606. In an example, the processor 602 may be a processing resource of a computing device for fetching and executing computer-readable instructions from the non-transitory computer-readable medium 604. The computing, device may be the computing device 300 as described with reference to FIG. 3.

The non-transitory computer-readable medium 604 can be, for example, an internal memory device or an external memory device. In an example implementation, the communication link 606 may be a direct communication link, such as any memory read/write interface. In another example implementation, the communication link 606 may be an indirect communication link, such as a network interface. In such a case, the processor 602 can access the non-transitory computer-readable medium 604 through a communication network 608.

In an example implementation, the non-transitory computer-readable medium 604 includes a set of computer-readable instructions for simulating virtual reality and avoiding collision between peer wearable apparatuses. The set of computer-readable instructions can be accessed by the processor 602 through the communication link 606 and subsequently executed to perform acts for projecting an image. The wearable apparatus 610 may be similar to the wearable apparatus 200. The wearable apparatus 610 communicatively couples with the processor 602 of the computing device over the communication network 608. The wearable apparatus 610 and the computing device communicate with each other over 802.11ad communication protocol.

Referring to FIG. 5, in an example, the non-transitory computer-readable medium 604 may include instructions 612 to provide AV content over to the wearable apparatus 610. The wearable apparatus 610 upon receiving the AV content segregates audio content and video content from the AV content and provide the audio content to the speaker unit of the wearable apparatus $10 and provide the video content to the HMD unit connected to the wearable apparatus 610.

The non-transitory computer-readable medium 604 may include instructions 614 to obtain a RSSI value associated with the AV content received at the wearable apparatus 610, and obtain gyro-sensor data being indicative of orientation of the wearable apparatus 610. The non-transitory computer-readable medium 604 may also include instructions 616 to determine a relative distance of the wearable apparatus 610 with respect to a peer wearable apparatus (not shown) based on the RSSI value and the gyro-sensor data associated with the wearable apparatus 610 and a RSSI value and gyro-sensor data associated with the peer wearable apparatus. The non-transitory computer-readable medium 604 may include instructions 618 to generate a collision avoidance indicator when the relative distance is less than a predefined distance, and include instructions 620 to provide the collision avoidance indicator over to the wearable apparatus 610 while providing the AV content. The collision avoidance indicator is indicative of a direction to move a user of the wearable apparatus 610 to increase the relative distance to avoid collision of users wearing the wearable apparatus 610 and the peer wearable apparatus.

In an example implementation, the non-transitory computer-readable medium 604 may include instructions to receive a notification to alter a signal transmission channel, when a signal quality value of the AV content, received at the wearable apparatus 610, is below a predefined quality threshold value. The non-transitory computer-readable medium 604 may include instructions to alter the signal transmission channel for subsequent transmission of AV content and other data, such as collision avoidance indicator.

Although examples for the present disclosure have been described in language specific to structural features and/or methods, it is to be understood that the appended claims are not limited to the specific features or methods described herein. Rather, the specific features and methods are disclosed and explained as examples of the present disclosure.

We claim:

1. A wearable apparatus comprising:
    a first set of antenna elements to receive audio-video (AV) content from a computing device; and
    a second set of antenna elements to receive a collision avoidance indicator from the computing device during the reception of the AV content, wherein the collision avoidance indicator is indicative of increasing a relative distance between the wearable apparatus and a peer wearable apparatus to avoid collision of users wearing the wearable apparatus and the peer wearable apparatus.

2. The wearable apparatus as claimed in claim 1, wherein the collision avoidance indicator is indicative of a direction to move a user of the wearable apparatus for increasing the relative distance.

3. The wearable apparatus as claimed in claim 1, comprising a gyro-sensor, wherein the second set of antenna elements is to transmit data associated with the gyro-sensor and a received signal strength indication (RSSI) value associated with the received AV content to the computing device, to determine the relative distance between the wearable apparatus and the peer wearable apparatus.

4. The wearable apparatus as claimed in claim 1, comprising a data processing engine coupled to the first set of antenna elements, wherein the data processing engine is to segregate audio content and video content from the AV content.

5. The wearable apparatus as claimed in claim 4, comprising a content output interface coupled to the data processing engine, wherein the data processing engine is to provide the video content through the content output interface to a head-mount display (HMD) unit.

6. The wearable apparatus as claimed in claim 5, wherein the data processing engine is to provide the collision avoidance indicator through the content output interface to the HMD unit.

7. The wearable apparatus as claimed in claim 4, comprising a speaker unit coupled to the data processing engine, wherein the data processing engine is to provide the audio content to the speaker unit.

8. The wearable apparatus as claimed in claim 1, wherein the first set of antenna elements and the second set of antenna elements are 802.11ad transceivers.

9. The wearable apparatus as claimed in claim 1, comprising a third set of antenna elements to transmit a notification to the computing device to alter a signal transmission channel, when a signal quality value of the received AV content is below a predefined quality threshold value.

10. A computing device comprising a transceiver to:
    transmit audio-video (AV) content over to a first set of antenna elements of a wearable apparatus;
    obtain from a second set of antenna elements of the wearable apparatus, a received signal strength indication (RSSI) value associated with the AV content received by a first set of antenna elements at the wearable apparatus;
    obtain gyro-sensor data being indicative of orientation of the wearable apparatus from the second set of antenna elements of the wearable apparatus; and
    transmit a collision avoidance indicator over to the second set of antenna elements of the wearable apparatus, during transmission of the AV content, to avoid collision of users wearing the wearable apparatus and a peer wearable apparatus, wherein the collision avoidance indicator is generated when a relative distance of the wearable apparatus with respect to the peer wearable apparatus is less than a predefined distance, and wherein the relative distance is determined based on the RSSI value and the gyro-sensor data associated with the wearable apparatus and a RSSI value and gyro-sensor data associated with the peer wearable apparatus;
    wherein the first set of antenna elements are used for receive the AV content and the second set of antennas are used for receiving the collision avoidance indicator.

11. The computing device as claimed in claim 10, wherein the collision avoidance indicator is indicative of a direction to move a user of the wearable apparatus for increasing the relative distance of the wearable apparatus with respect to the peer wearable apparatus.

12. The computing device as claimed in claim 10, wherein the transceiver is a 802.11ad transceiver.

13. The computing device as claimed in claim 10, wherein the transceiver is to receive a notification to alter a signal transmission channel, when a signal quality value of the AV content, received at the wearable apparatus, is below a predefined quality threshold value.

14. A non-transitory computer-readable medium comprising computer-readable instructions, which, when executed by a processor, cause the processor to:
provide audio-video (AV) content over to a first set of antenna elements of a wearable apparatus;
obtain from a second set of antenna elements of the wearable apparatus, a received signal strength indication (RSSI) value associated with the AV content received by a first set of antenna elements at the wearable apparatus;
obtain gyro-sensor data being indicative of orientation of the wearable apparatus from the second set of antenna elements of the wearable apparatus;
determine a relative distance of the wearable apparatus with respect to a peer wearable apparatus based on the RSSI value and the gyro-sensor data associated with the wearable apparatus and a RSSI value and gyro-sensor data associated with the peer wearable apparatus;
generate a collision avoidance indicator when the relative distance is less than a predefined distance, wherein the collision avoidance indicator is indicative of a direction to move a user of the wearable apparatus to increase the relative distance to avoid collision of users wearing the wearable apparatus and the peer wearable apparatus; and
provide the collision avoidance indicator over to the second set of antenna elements of the wearable apparatus while providing the AV content;
wherein the first set of antenna elements are used for receive the AV content and the second set of antennas are used for receiving the collision avoidance indicator.

15. The non-transitory computer-readable medium as claimed in claim 14, wherein the instructions which, when executed by the processor, cause the processor to:
receive a notification to alter a signal transmission channel, when a signal quality value of the AV content, received at the wearable apparatus, is below a predefined quality threshold value.

* * * * *